United States Patent
Chang et al.

(10) Patent No.: US 9,757,770 B2
(45) Date of Patent: Sep. 12, 2017

(54) ASYMMETRIC BENDER BAR TRANSDUCER

(71) Applicant: Halliburton Energy Services, Inc., Houston, TX (US)

(72) Inventors: Chung Chang, Houston, TX (US); Chen Li, Katy, TX (US); Arthur Cheng, Houston, TX (US); Jing Jin, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 93 days.

(21) Appl. No.: 14/787,733

(22) PCT Filed: Sep. 30, 2013

(86) PCT No.: PCT/US2013/062548
§ 371 (c)(1),
(2) Date: Oct. 28, 2015

(87) PCT Pub. No.: WO2015/047369
PCT Pub. Date: Apr. 2, 2015

(65) Prior Publication Data
US 2016/0114354 A1    Apr. 28, 2016

(51) Int. Cl.
*G01V 1/44* (2006.01)
*B06B 1/06* (2006.01)
(Continued)

(52) U.S. Cl.
CPC .......... *B06B 1/0603* (2013.01); *B06B 1/0207* (2013.01); *E21B 47/101* (2013.01);
(Continued)

(58) Field of Classification Search
CPC ........ E21B 47/101; G01V 1/159; G01V 1/44; H04R 17/00; B06B 1/0603; B06B 1/0207; H01L 41/18
(Continued)

(56) References Cited

U.S. PATENT DOCUMENTS 4,782,910 A    11/1988    Sims
4,949,316 A    8/1990    Katahara et al.
(Continued)

FOREIGN PATENT DOCUMENTS

CA          2033593 A1        7/1992
WO    WO-2012034071 A1        3/2012
WO    WO-2015047369 A1        4/2015

OTHER PUBLICATIONS

"International Application Serial No. PCT/US2013/062548, International Search Report mailed Jun. 26, 2014", 3 pgs.
(Continued)

*Primary Examiner* — Daniel L Murphy
(74) *Attorney, Agent, or Firm* — Gilliam IP PLLC

(57) ABSTRACT

Apparatus and techniques are described, such as for obtaining information indicative of an acoustic characteristic of a formation, including using a transducer assembly, comprising a base plate, a first piezoelectric slab and a second piezoelectric slab. The base plate includes a first region extending axially in a first direction beyond the first and second piezoelectric slabs along a specified axis of the base plate and a second region extending axially in a second direction, opposite the first direction, beyond the first and second piezoelectric slabs. In various examples, a length of the first region along the specified axis is different than a length of the second region to provide an asymmetric configuration. In various examples, an anchoring element is mechanically coupled to the base plate at a location corresponding to a node location of a specified acoustic vibration mode.

22 Claims, 17 Drawing Sheets

(51) Int. Cl.
*E21B 47/10* (2012.01)
*G01V 1/02* (2006.01)
*B06B 1/02* (2006.01)
*H01L 41/18* (2006.01)
*H04R 17/00* (2006.01)

(52) U.S. Cl.
CPC ............... *G01V 1/159* (2013.01); *G01V 1/44* (2013.01); *H01L 41/18* (2013.01); *H04R 17/00* (2013.01)

(58) Field of Classification Search
USPC .................................. 367/31; 310/317, 334
See application file for complete search history.

(56) References Cited

U.S. PATENT DOCUMENTS

| | | |
|---|---|---|
| 5,081,391 A | 1/1992 | Owen |
| 5,109,698 A | 5/1992 | Owen |
| 5,677,894 A | 10/1997 | Erath |
| 5,815,466 A | 9/1998 | Erath |
| 2008/0079331 A1 | 4/2008 | Butler et al. |

OTHER PUBLICATIONS

"International Application Serial No. PCT/US2013/062548, Written Opinion mailed Jun. 26, 2014", 7 pgs.

Balogh, W. Thomas, et al., "New Piezoelectric Transducer for Hole-to-hole Seismic Applications", 1988 SEG Annual Meeting, Oct. 30-Nov. 3, 1988, Anaheim, California, (1988), 155-157.

Haldorsen, Jakob B.U., et al., "Borehole Acoustic Waves", Oilfield Review, Spring 2006, [Online]. Retrieved from the Internet <http://www.slb.com/~/media/Files/resources/oilfield_review/ors06/spr06/03_borehole_acoustic_waves.pdf>, (Accessed Jun. 24, 2013), 34-43.

Owen, T. E, "A New Seismo-Acoustic Probe for Seabed Measurements", Offshore Technology Conference, May 7-May 10, 1990, Houston, Texas, (1990), 291-298.

"Australian Application Serial No. 2013401927, Examination Report mailed May 5, 2016", 2 pgs.

"European Application Serial No. 13894572.0, Response filed Sep. 1, 2016 to Communication pursuant to Rules 161(1) and 162 EPC mailed Mar. 11, 2016", 14 pgs.

"International Application Serial No. PCT/US2013/062548, International Preliminary Report on Patentability mailed Apr. 14, 2016", 9 pgs.

ASYMMETRIC BENDER BAR TRANSDUCER

PRIORITY APPLICATION

This application is a U.S. National Stage Filing under 35U.S.C. 371 from International Application No. PCT/US2013/062548, filed Sep. 30, 2013; and published as WO 2015/047369 on Apr. 2, 2015; which application and publication are incorporated herein by reference in their entirety.

BACKGROUND

Various techniques may be used to evaluate geological formations. For example, measurements may be made using tools located within a borehole such as in support of geophysical and petrophysical exploration or resource extraction. In one approach, an acoustic or "sonic" logging technique is used. A transducer is located in the borehole and is electrically driven to insonify a region nearby the transducer. Insonification induces propagating acoustic waves in the borehole, within the geologic formation through which the borehole extends, or along the interface between the geologic formation and the borehole.

In one approach, a monopole acoustic transducer is used. The monopole acoustic transducer generally emits an acoustic wavefront having spherical or cylindrical uniformity. Such a symmetric wavefront induces a compressive wavefront or "P-wave." A portion of the P-wave is reflected by the interface between the borehole and the formation at the borehole wall, and a portion of the P-wave is refracted within the formation. As the propagation direction of the refracted portion of the P-wave converges on the borehole-formation interface, a portion of the refracted P-wave energy is transferred back into the borehole (e.g., a first "head wave"). Reflected or refracted waves are then detected at respective locations remotely with respect to the transmitting transducer, such as a few meters or tens of meters away, providing information about the propagation characteristics of the formation (and thus information indicative of formation composition or porosity). A time difference between arrivals of the P-waves at respective transducers is divided by a distance between the transducers to obtain a "slowness" parameter, having units that represent an inverse of velocity (e.g., microseconds per foot or microseconds per meter).

A transverse or shear wavefront, referred to as an "S-wave," may also be induced in the formation by a monopole transducer, if the formation supports a shear wave speed faster than the velocity of a wave traveling exclusively in the fluid surrounding the borehole (e.g., a "mud wave"). When this condition is met, the formation is referred to as a "fast formation." The S-wave is similarly refracted toward the borehole-formation interface, and is detected at the respective remote locations typically following the refracted P-wave. In this manner, "shear slowness" is then determined using the time difference between arrivals of a shear wave signature at respective receiving transducers, divided by the distance between the transducers.

Other acoustic propagation modes are also supported, such as a surface wave at the borehole-formation interface, referred to as a "Stoneley wave." The arrival of the Stoneley wave at the receiving transducers generally occurs after the refracted P-wave and S-wave arrivals, and the Stoneley wave exhibits a varying degree of penetration into the formation and a slightly varying propagation velocity depending on the frequency of acoustic energy. Information about such frequency dependence or "dispersion" is used to provide information about formation permeability.

Monopole transducers provide only a limited range of acoustic modes that can be launched into the formation depending on the formation properties and only a limited range of frequencies of acoustic radiation. For example, monopole acoustic transducers may be unsuitable as a transmission source for measurement of shear slowness in "slow" formations (e.g., where a shear wave propagation velocity is slower in the formation than in the fluid filling the borehole). Monopole transducers may also be unsuitable for determination of shear wave anisotropy with respect to rotational position or azimuth around a circumference of the borehole, or for determination other parameters such as flexural wave dispersion for "slow" formations.

DETAILED DESCRIPTION

A dipole acoustic transducer may be used in a variety of applications, such as located in a borehole through a geologic formation to provide acoustic energy to excite the formation. A dipole acoustic transducer provides the ability to excite shear waves in formations where a shear wave propagation velocity is lower than a borehole propagation velocity, a configuration referred to as a "slow" formation. Unlike a monopole transducer, a dipole transducer can excite a dispersive flexural mode in a "slow" formation which propagates at a velocity corresponding to a shear wave velocity in the low frequency range. Excitation may also be performed with two or more dipole transducers having radiation planes located orthogonally to each other. This configuration is referred to as a crossed-dipole configuration.

Figure 1B:
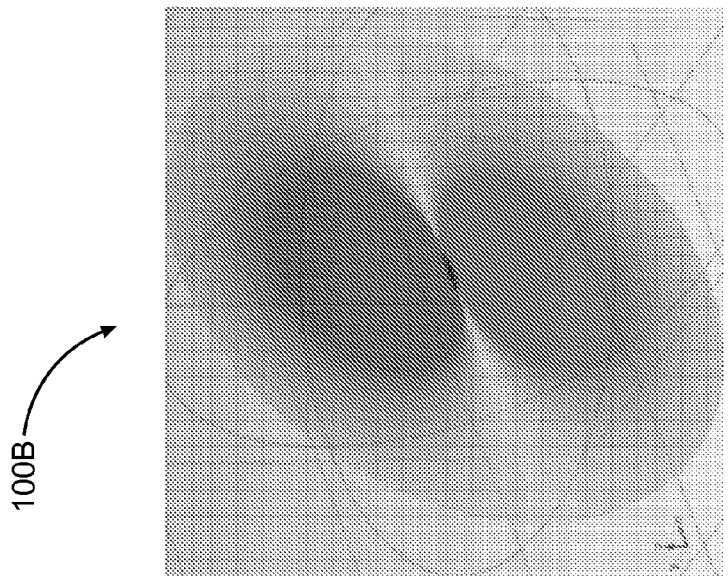
FIGS. 1A and 1B illustrate generally a simulation of an example of a symmetric acoustic bender bar transducer deformed in a first acoustic vibration mode.
Figure 1A:
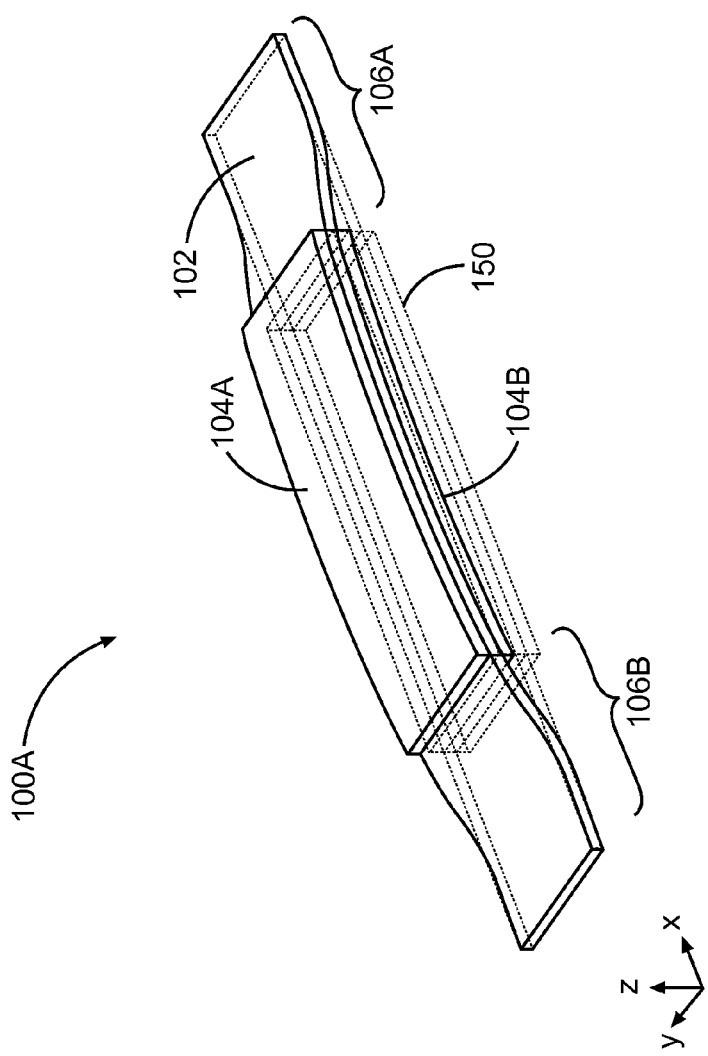
Figure 1C:
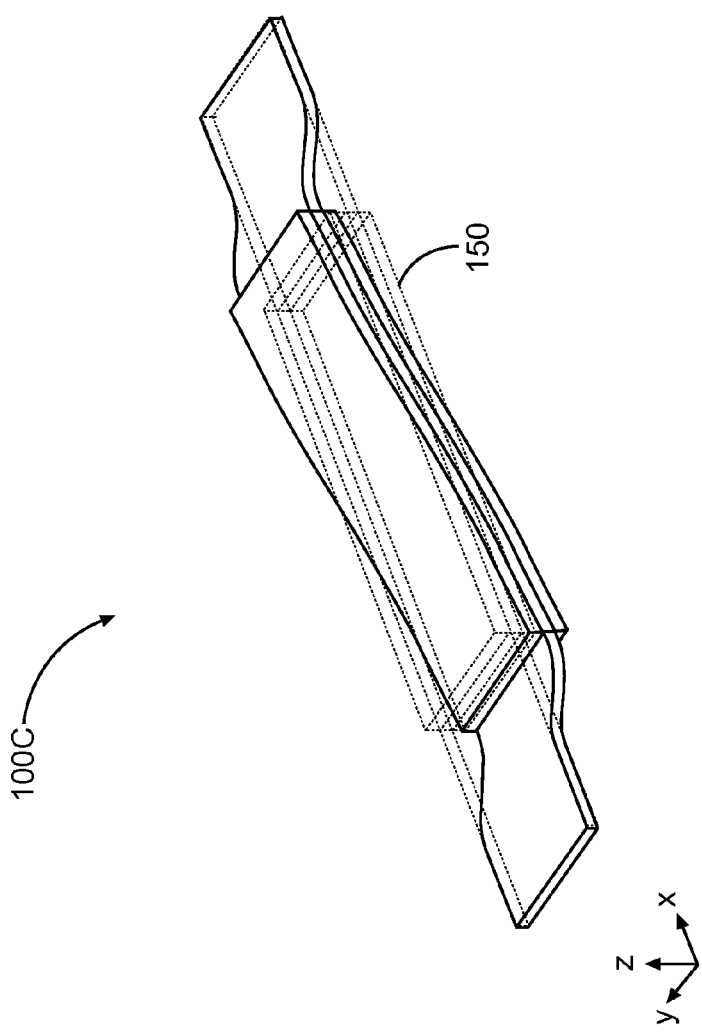
FIGS. 1C and 1D illustrate generally a simulation of an example of a symmetric acoustic bender bar transducer deformed in a second order acoustic vibration mode.
Figure 1D:
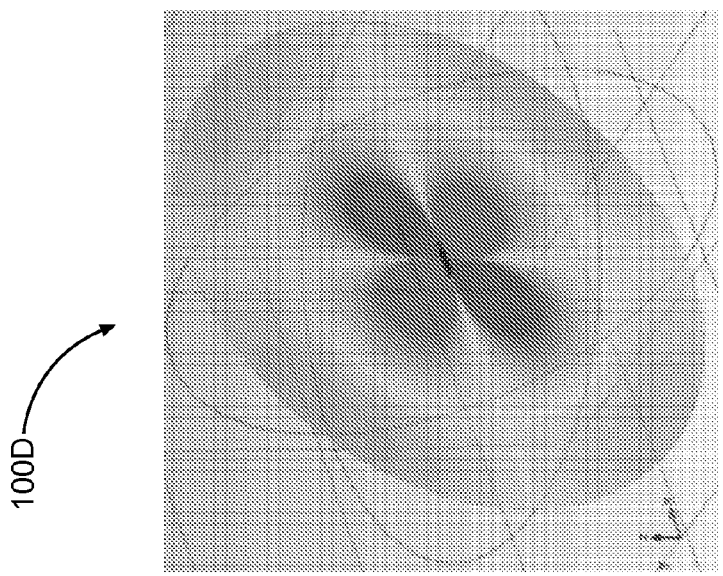
Figure 1F:
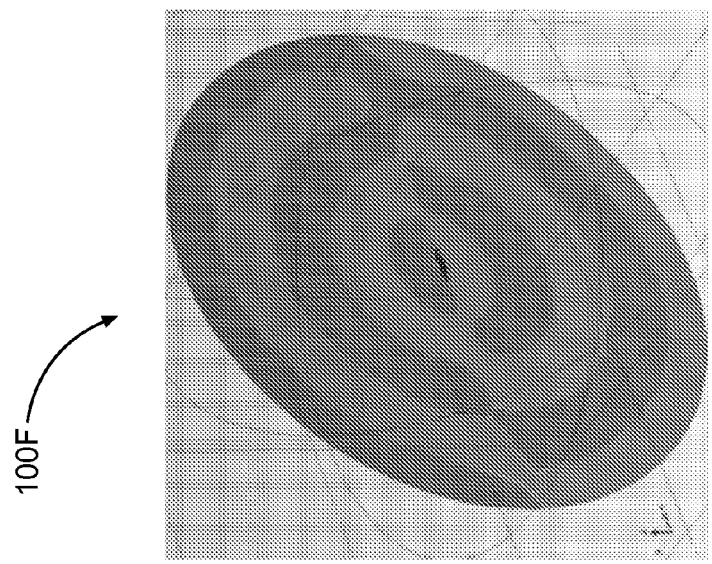
FIGS. 1E and 1F illustrate generally a simulation of an example of a symmetric acoustic bender bar transducer deformed in a third order acoustic vibration mode.
Figure 1E:
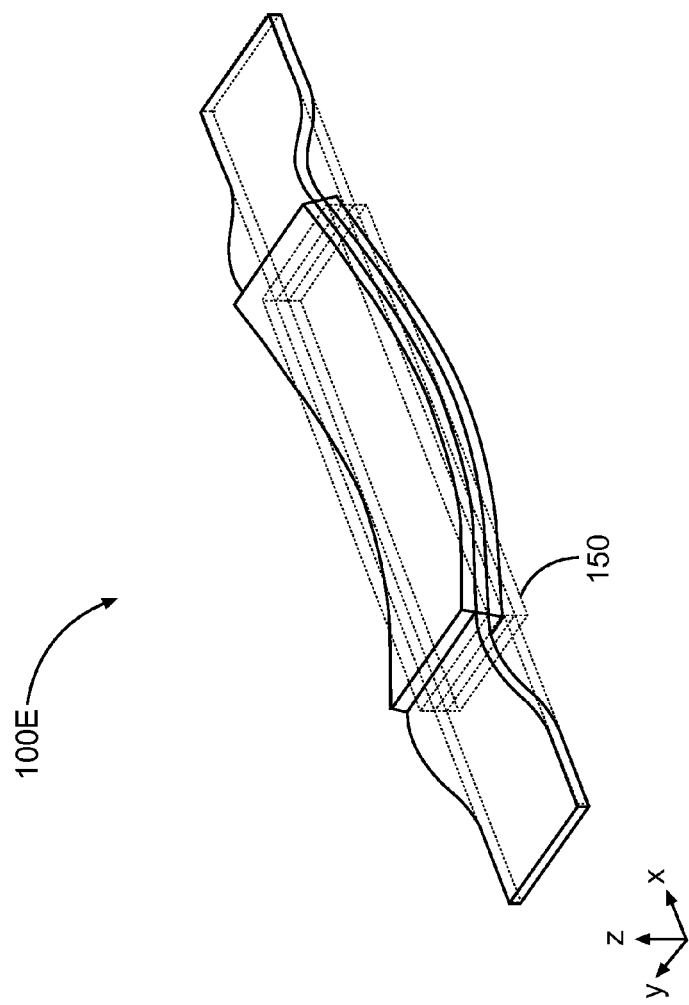
Figure 2:
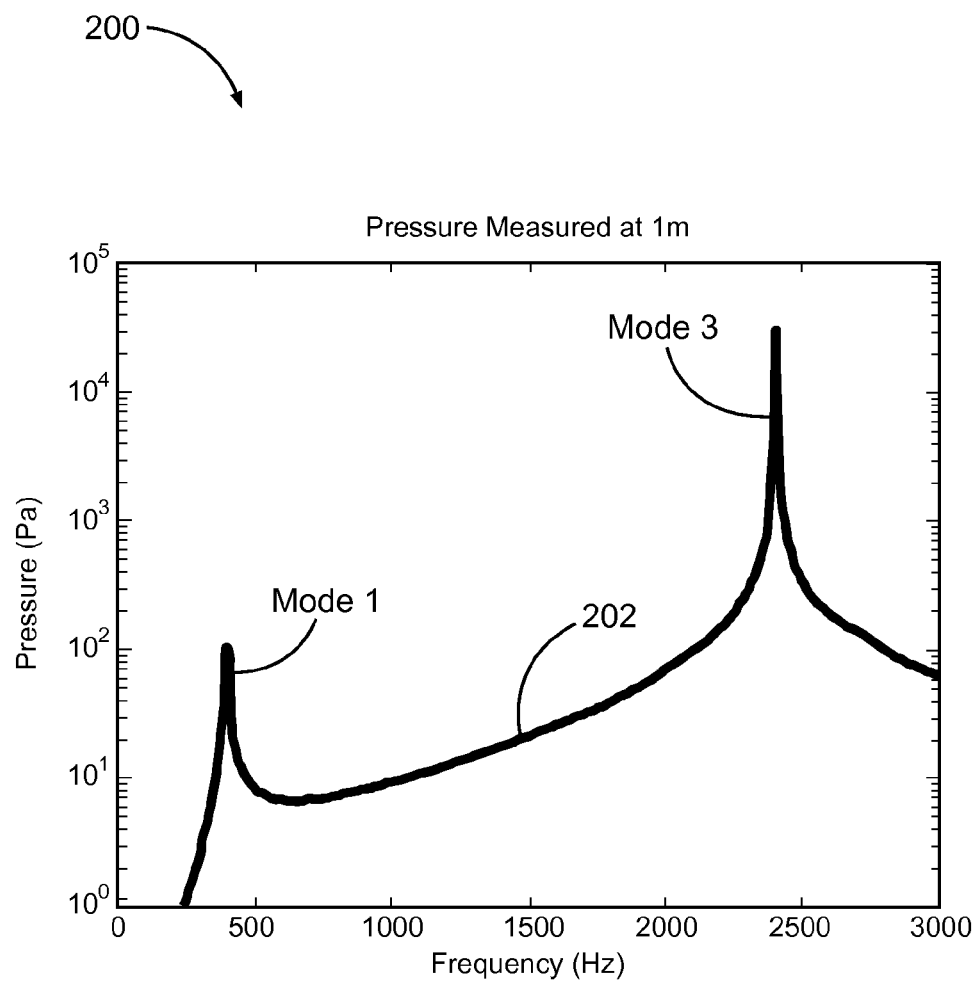
FIG. 2 illustrates generally an example of a pressure simulated at a measurement location centrally-located one meter away from a symmetric acoustic bender bar transducer in water.

A symmetric dipole acoustic transducer, such as shown in the examples of FIGS. 1A through 1F, and having a frequency response as illustrated generally in FIG. 2, will not provide appreciable acoustic radiation at or near a second order vibration mode resonance. In contrast, the present inventors have recognized that an asymmetric dipole acoustic transducer, such as shown in the examples of FIGS. 4A through 4F, and having a frequency response as illustrated generally in FIG. 5, provides net acoustic radiation when operated at or near a second order vibration mode resonance.

Apparatus and techniques are described herein, such as for obtaining information indicative of an acoustic characteristic of a formation, such as compressional slowness, shear slowness, or an acoustic dispersion characteristic such as for a dipole-excited flexural mode, including using a transducer assembly, comprising a base plate, a first piezoelectric slab located on a first surface of the base plate, and a second piezoelectric slab located on a second surface of the base plate opposite the first surface. The base plate includes a first region extending axially in a first direction beyond the first and second piezoelectric slabs along a specified axis of the base plate and a second region extending axially in a second direction, opposite the first direction, beyond the first and second piezoelectric slabs along the specified axis of the acoustic transducer assembly. The length of the first region along the specified axis is different than a length of the second region to provide an asymmetric configuration. As mentioned above, the present inventors have recognized, among other things, that such an asymmetric configuration provides useful acoustic radiation in a second order acoustic vibration mode of the acoustic transducer assembly, such as shown illustratively in the examples of FIGS. 4C, 4D and 5.

Figure 11:
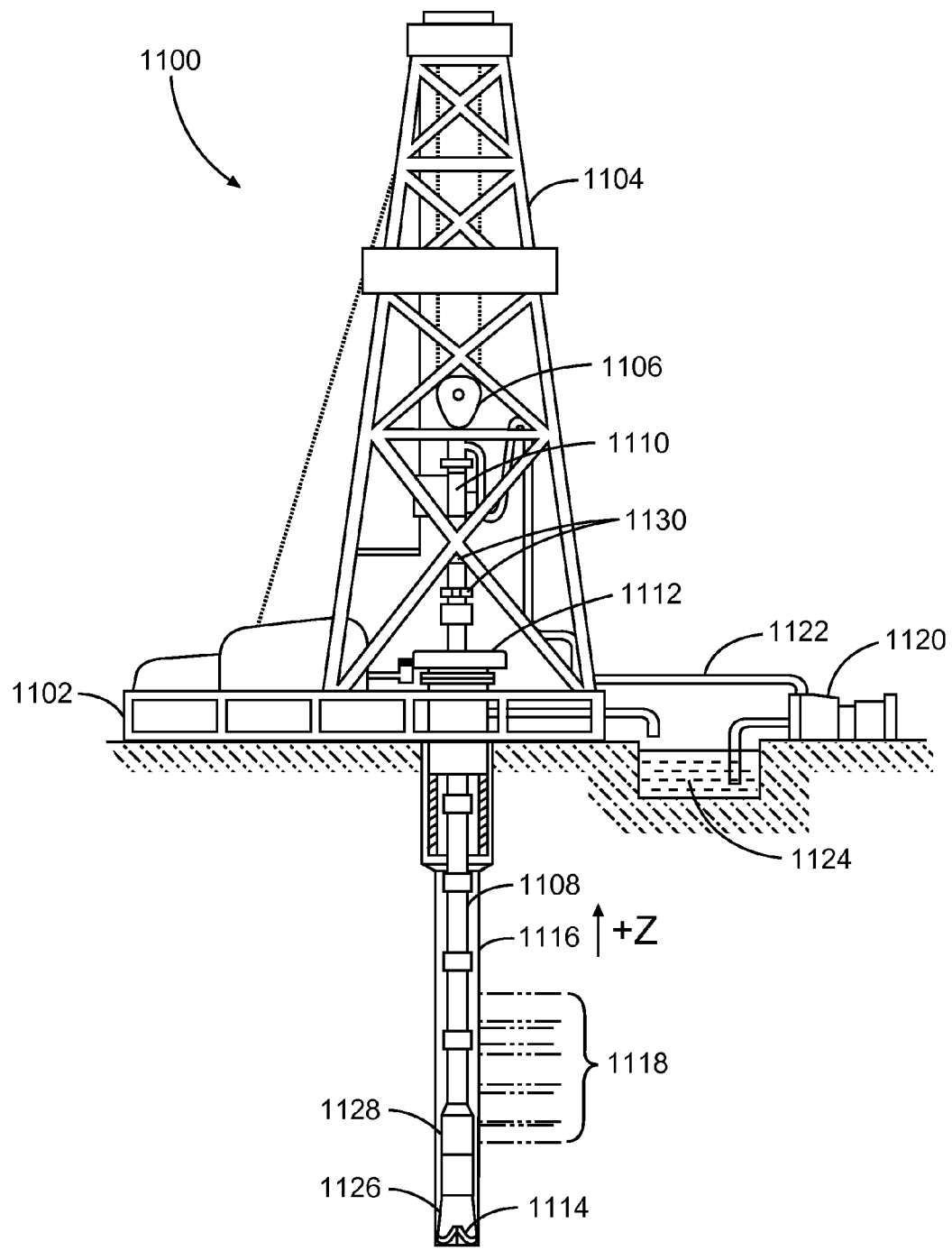
FIG. 11 illustrates generally an example of a drilling apparatus, such as including a measure-while-drilling (MWD) or log-while-drilling (LWD) capability.
Figure 12:
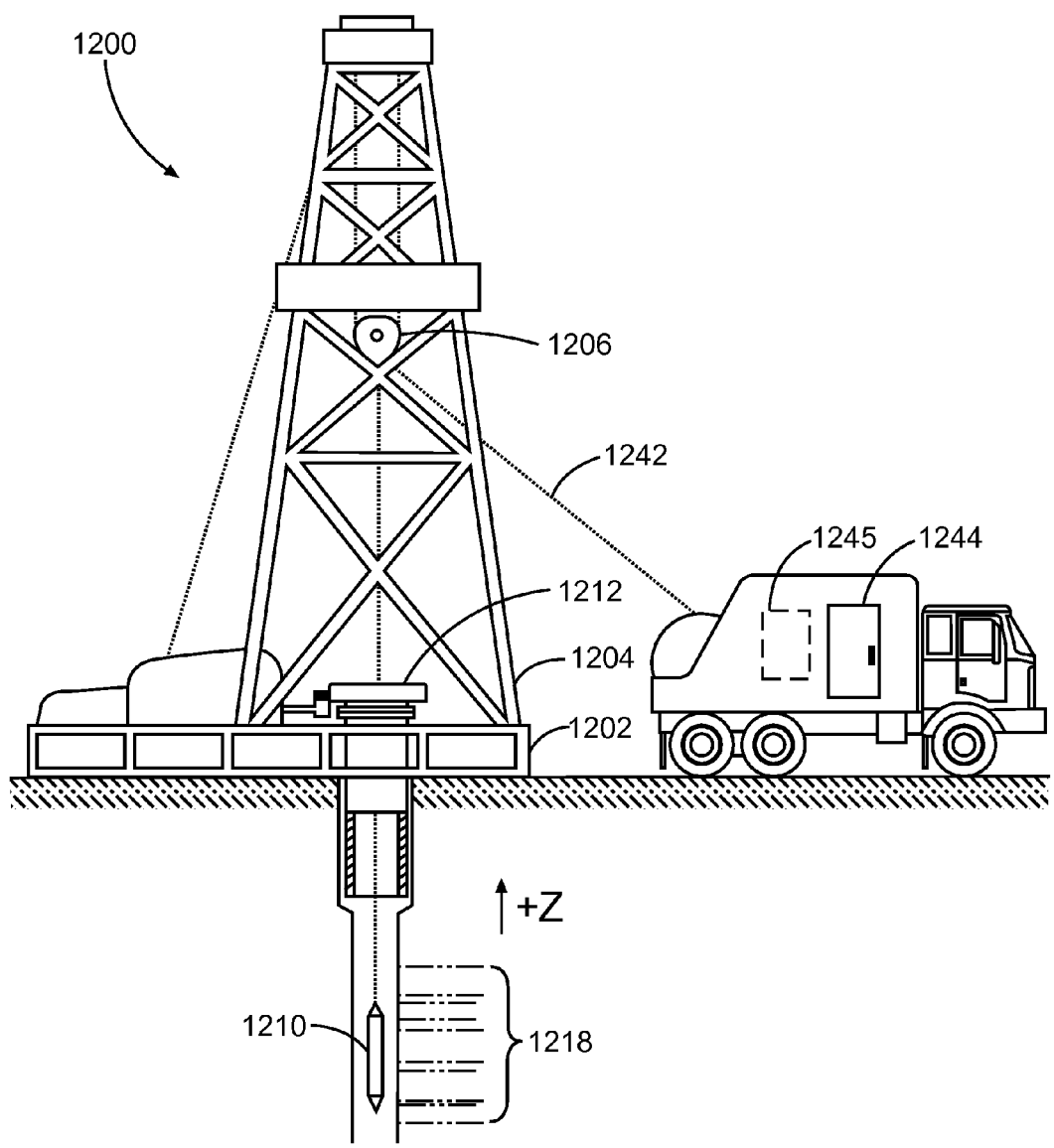
FIG. 12 illustrates generally an example of a wireline logging apparatus.
Figure 13:
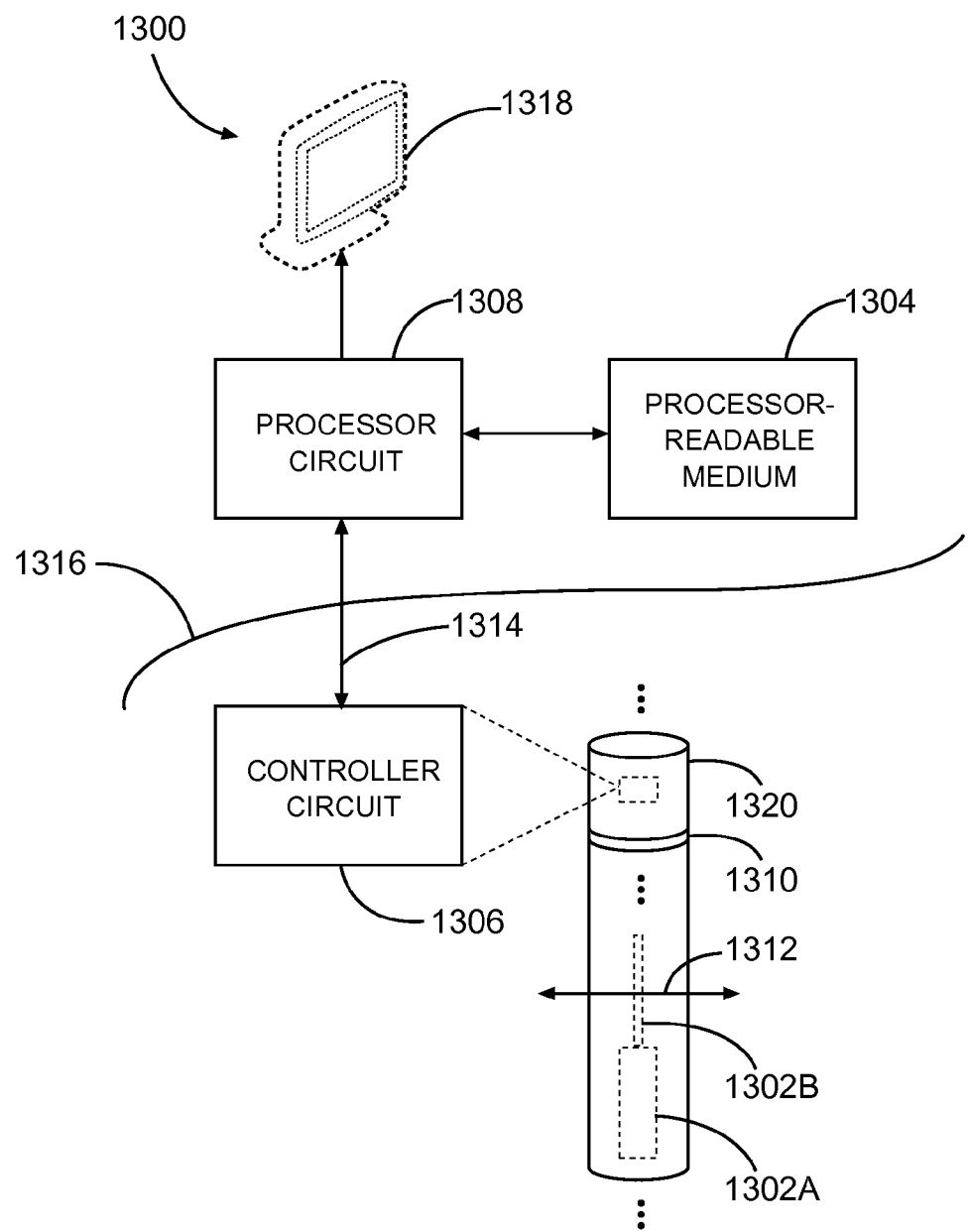
FIG. 13 illustrates generally an example of a system, including a well tool within a borehole communicatively coupled to apparatus on the surface.

FIGS. 1A and 1B illustrate generally a simulation of an example of a symmetric acoustic bender bar transducer 150 deformed in a first order acoustic vibration mode 100A, hereinafter referred a first order mode 100A or "Mode 1." Various examples of well tools that may house one or more dipole transducers are shown in FIGS. 11 through 13, which according to various examples include a symmetric acoustic bender bar transducer 150 shown in FIG. 1A. According to various examples, the acoustic bender bar transducer 150 includes a base plate 102, made of steel or another material having desired stiffness or compatibility with the borehole environment. The base plate 102 may be electrically conductive, such as used as an electrode for coupling a voltage to or from a piezoelectric element, or the base plate 102 may be an electrical insulator and separate electrodes can be used for piezoelectric excitation or sensing.

A first piezoelectric slab 104A is located on a first surface of the base plate 102, and a second piezoelectric slab 104B is located on the second surface of the base plate 102, opposite the first surface. The base plate 102 is generally non-piezoelectric, and the piezoelectric slabs 104A and 104B may be fabricated using a material such as lead zirconate titanate (PZT), or one or more other piezoelectric materials.

In a transmission mode of operation, a time-varying voltage is applied to the piezoelectric slabs 104A and 104B, to establish respective electric fields within the slabs. Such electric fields induce mechanical expansion and contraction movements lengthwise in the piezoelectric slabs 104A and 104B. When driven with the appropriate polarity, the first piezoelectric slab 104A expands, while the second piezoelectric slab 104B contracts, and vice versa. These two alternating movements together cause the transducer to bend upwards and downwards with respect to the plane of the base plate 102, and such bending displaces surrounding fluid, establishing acoustic radiation.

In the illustrations of FIGS. 1A, 1C, and 1E, the acoustic bender bar transducer 150 includes a base plate 102 having first region 106A that extends axially away from the first and second piezoelectric slabs 104A and 104B (or a separate flange attached to the base plate in the first region 106A). Similarly, a second region 106B extends axially away from the first and second piezoelectric slabs 104A and 104B in a direction opposite the first region 106A. The lengths of the first and second regions 106A and 106B are equal in these examples, and thus the acoustic bender bar transducer 150 is referred to as "symmetric" with respect to a long axis, X, of transducer 150 along the base plate 102. The examples of FIGS. 1A, 1C, and 1E are also symmetric with respect to thickness (e.g., axis Z) and lateral width (e.g., axis Y) of the transducer 150.

In particular, FIG. 1A illustrates generally a deflection shape of the first order mode 100A, simulated using Finite Element Analysis (COMSOL 14.3a, available from COMSOL, Inc., Burlington, Mass., USA). A corresponding pressure field 100B is shown in FIG. 1B, simulated to show a pressure developed when the transducer 150 is immersed in water and excited at or near a first order vibration mode resonance. From the pressure field 100B, it is shown that a net acoustic radiation component will be generated symmetrically above and below the plane of the transducer 150 as the transducer bends upward and downward with respect to a neutral position.

FIGS. 1C and 1D illustrate generally a simulation of an example of a symmetric acoustic bender bar transducer 150 deformed in a second order mode 100C, and a corresponding simulated pressure field 100D. In the example of FIG. 1C, a first portion of the transducer 150 along the longitudinal axis is displaced upward, and an equal second portion of the transducer 150 is displaced downward, with respect to a neutral (unbent) transducer. The simulated pressure field 100D shows that in a location centered above or below the plane of the transducer 150, there is no net radiation component, because the displacements coupled from each end of the transducer 150 cancel each other.

Accordingly, for the symmetric configuration of FIG. 1C, the second order mode is effectively non-transmitting in comparison to the pressure field 100B shown in FIG. 1B corresponding to the first order mode 100A of FIG. 1A, or the pressure field 100F shown in FIG. 1F corresponding to the third order mode 100E in FIG. 1E, below. In the pressure field 100D nearby the transducer, local regions of higher amplitude may exist, but as the distance between the transducer and the simulated measurement location increases, the net pressure drops off rapidly. This is not to assert that there is no radiation component whatsoever in the second order mode 100C. The net acoustic radiation for the second order mode 100C is generally about an order of magnitude lower in pressure, or more, such as measured at 1 meter as shown in FIG. 2 as compared to the odd-numbered modes shown in FIGS. 1A and 1E. FIGS. 1E and 1F illustrate generally a simulation of an example of a symmetric acoustic bender bar transducer 150 deformed in a third order acoustic vibration mode 100E. The pressure field 100F shows that a net radiation component exists for this third order mode.

FIG. 2 illustrates generally an example 200 of an absolute pressure 202 in Pascals (Pa) shown with respect to acoustic oscillation frequency, simulated at a measurement location centrally-located one meter away from a plane of the symmetric acoustic bender bar transducer in water. In each of the examples of FIGS. 1A and 1B (i.e., "Mode 1"), FIGS. 1C and 1D (i.e., "Mode 2"), and FIGS. 1E and 1F (i.e., "Mode 3"), the respective acoustic vibration modes correspond to respective natural frequencies of the acoustic transducer 150 structure. At these frequencies, the coupling (e.g., conversion) factor from electrical energy to mechanical energy is at a local maximum. However, as discussed above, for a symmetric acoustic transducer 150, Mode 1 and Mode 3 provide useful acoustic radiation as indicated by the pressure 202 simulated at one meter distance, shown in FIG. 2. However, in a range from about 400 Hz to about 2400 Hz, the symmetric acoustic transducer 150 does not provide appreciable pressure and therefore does not radiate acoustic energy usefully.

Figure 3A:
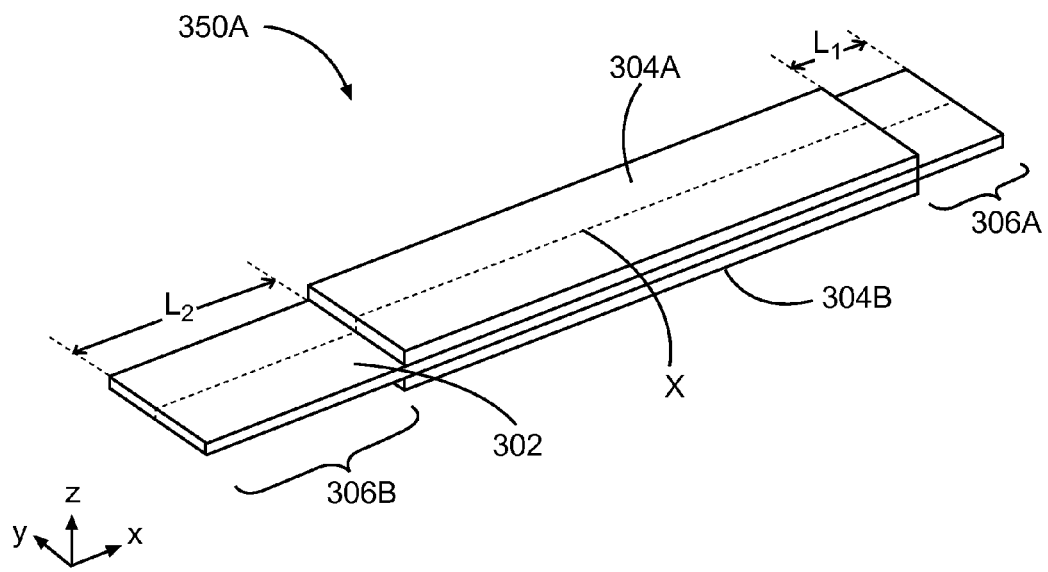
FIG. 3A illustrates generally an example of an asymmetric acoustic bender bar transducer.

FIG. 3A illustrates generally an example of an asymmetric acoustic bender bar transducer 350A. Similar to the examples of FIGS. 1A, 1C, and 1E, the transducer 350A includes a base plate 302, such as including steel or one or more other materials. A first piezoelectric slab 304A is mechanically coupled to a first surface of the base plate 302, and a second piezoelectric slab 304B is mechanically coupled to a second surface of the base plate 302 opposite the first surface. In some examples, the piezoelectric slabs 304A and 304B are electrically coupled to the base plate 302, and the base plate serves as an electrode for use in part in providing an electric drive signal to the acoustic transducer 350A. In the example of FIG. 3A, a first region 306A of the base plate 302 (or a portion attached to the base plate 302) extends in a first direction along a longitudinal axis, X, of the base plate 302, and includes a first length, $L_1$. A second region 306B extends longitudinally in a direction opposite the first direction, and includes a second length, $L_2$. Unlike the examples of FIGS. 1A, 1C, and 1E, the lengths of the first and second regions 306A and 306B shown in FIG. 3A are different from each other, to provide an asymmetric configuration along the length of the base plate 302.

Figure 3B:
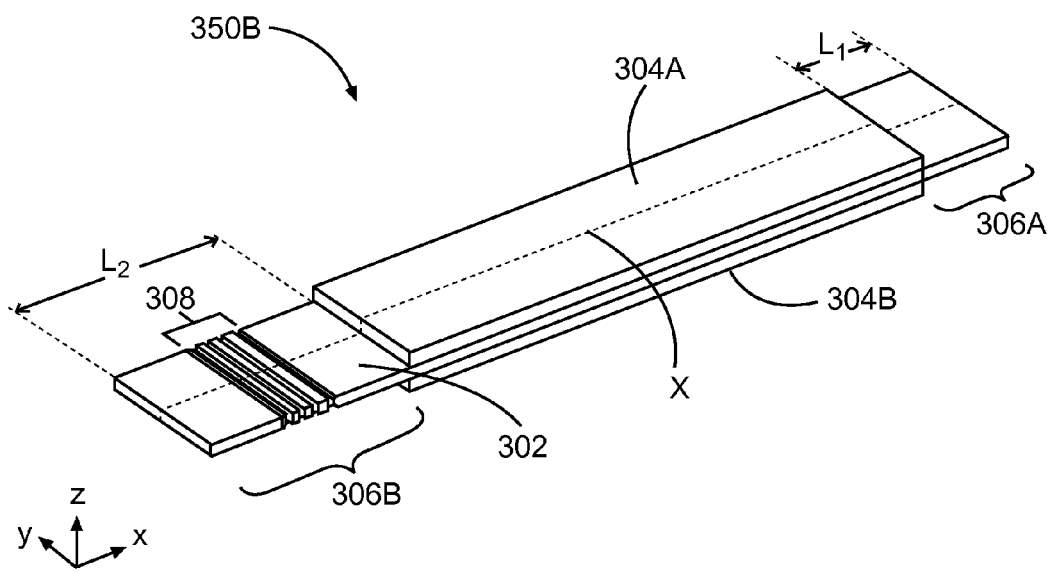
FIG. 3B illustrates generally an example of an asymmetric acoustic bender bar transducer including stiffness reducing features.
Figure 6:
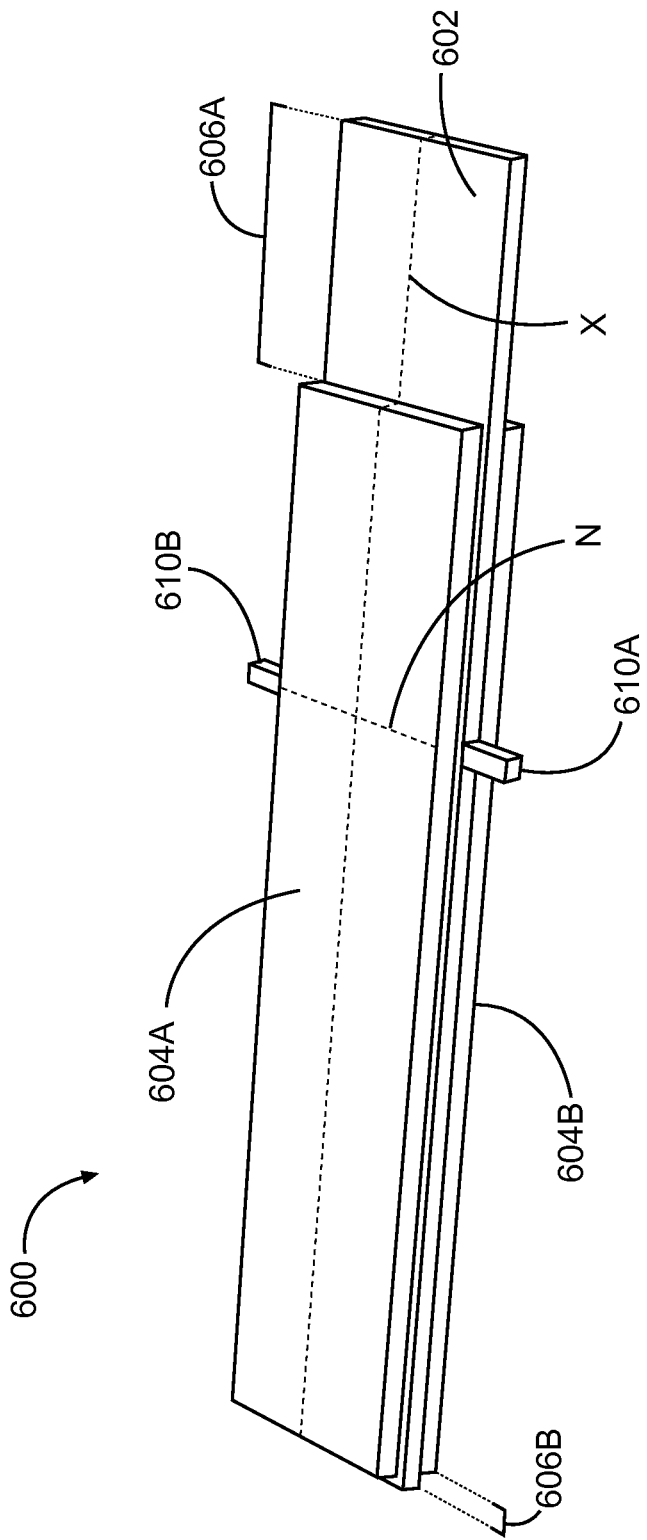
FIG. 6 illustrates generally an example of an acoustic bender bar transducer including an anchoring element.

As discussed generally above, a dipole acoustic transducer may be used in well logging applications where flexural modes of the borehole are to be excited, for applications such as shear wave anisotropy measurement or shear slowness measurement. In slow formation measurement cases, the excitation function of the bore structure moves lower in frequency. Such lower frequencies may include frequencies in the range of about 400 Hz to about 2400 Hz, which are not efficiently excited by a symmetric dipole configuration. Accordingly, the present inventors have recognized, among other things, that the asymmetric acoustic transducer configurations, such as shown in the examples of FIGS. 3A, 3B, and FIG. 6 "break" the symmetry of an acoustic bender bar transducer along a long axis, X, so that the previously non-transmitting mode (i.e., Mode 2) becomes transmitting, particularly in a range of frequencies useful for sonic logging in relation to slow formations. This may eliminate a need for using multiple bender bars having differing total lengths in order to provide frequency coverage in the range of about 400 Hz to about 2400 Hz.

According to some examples, a total length of the base plate 302, or a difference in lengths of the first region 306A and 306B are used to adjust or establish radiation in one or more acoustic vibration modes. For example, a difference in lengths of the first and second regions 306A and 306B may be used to adjust or establish radiation at a specified frequency of a second order acoustic vibration mode. The different first and second lengths $L_1$ and $L_2$ may be established, for example, by coupling the first and second dielectric slabs 304A and 304B to the base plate 302 at a location offset from a center of the base plate 302, along the longitudinal axis, X, of the base plate 302.

FIG. 3B illustrates generally an example of an asymmetric acoustic bender bar transducer 350B including stiffness adjusting features in the region 308. As in the examples discussed in relation to FIG. 3A, the acoustic bender bar transducer 350B includes a first region 306A extending in a first direction along a base plate 302, and a second region 306B extending in a second direction along the base plate 302, opposite the first direction.

The present inventors have recognized, among other things, that the asymmetric transducer 350A configuration may increase a frequency of one or more acoustic vibration modes, such as a third order acoustic vibration mode, as compared to a symmetric transducer 150 configuration of FIGS. 1A, 1C, and 1E having a similar overall length. The present inventors have also recognized, among other things, that inclusion of the stiffness adjusting features in the region 308 adjusts the frequency of one or more acoustic vibration modes. For example, as shown in FIG. 5, the stiffness adjusting features in region 308 is used to shift the second order and third order mode resonances downwards in frequency as compared to an asymmetric transducer 350A configuration lacking such stiffness adjusting features. The stiffness adjusting features may include slots, grooves, penetrations such as holes, or other shapes, for example.

As in FIG. 3A, first and second piezoelectric slabs 304A and 304B are respectively coupled to surfaces of the base plate 302 opposite each other, as shown. According to some examples, a first length $L_1$, of the first region 306A is different than a second length, $L_2$, of the second region 306B. While FIG. 3B illustrates an asymmetric example, the stiffness adjusting features of FIG. 3B may also be applied to a symmetric bender bar configuration, such as to establish or adjust one or more frequencies corresponding to one or more acoustic vibration modes. According to various examples, well tools that may house one or more dipole transducers are shown in FIGS. 11 through 13, such as including an asymmetric acoustic bender bar transducer 350A shown in FIG. 3A, or an asymmetric acoustic bender bar transducer 350B shown in FIG. 3B.

Figure 4B:
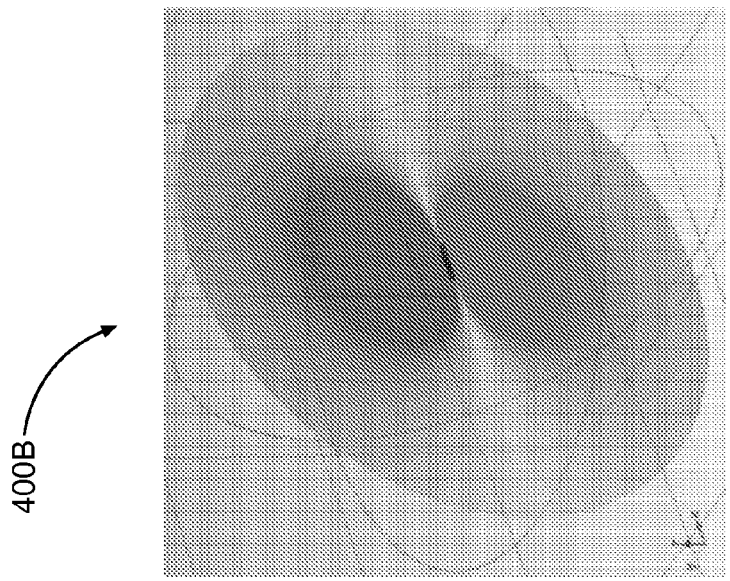
FIGS. 4A and 4B illustrate generally a simulation of an example of an asymmetric acoustic bender bar transducer deformed in a first order acoustic vibration mode.
Figure 4A:
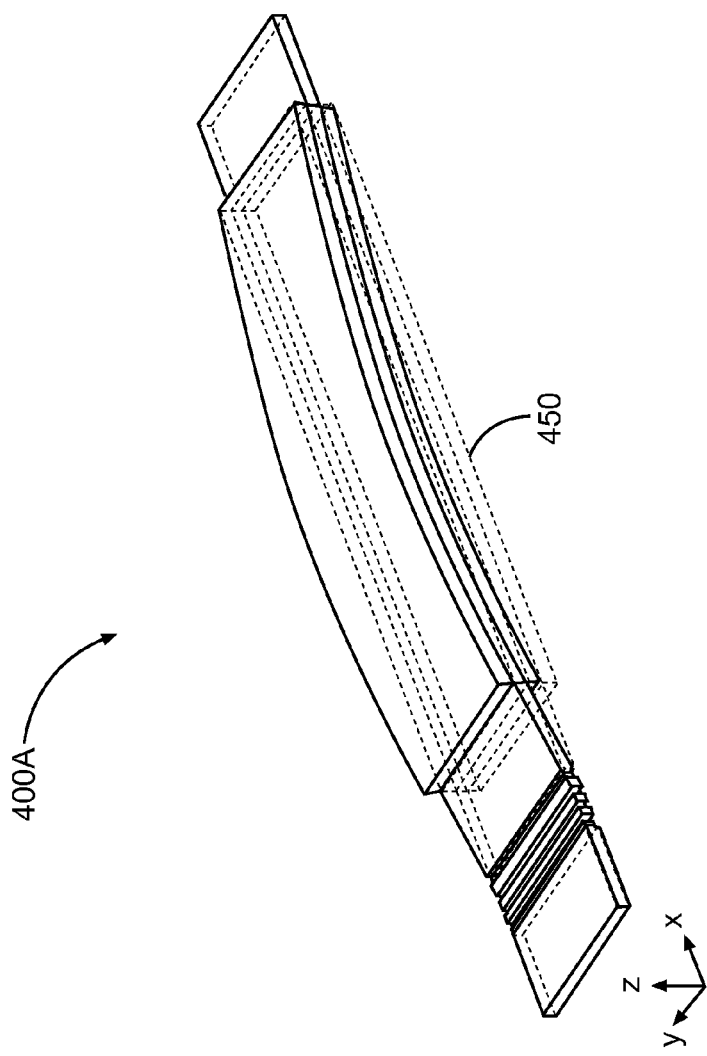
Figure 4D:
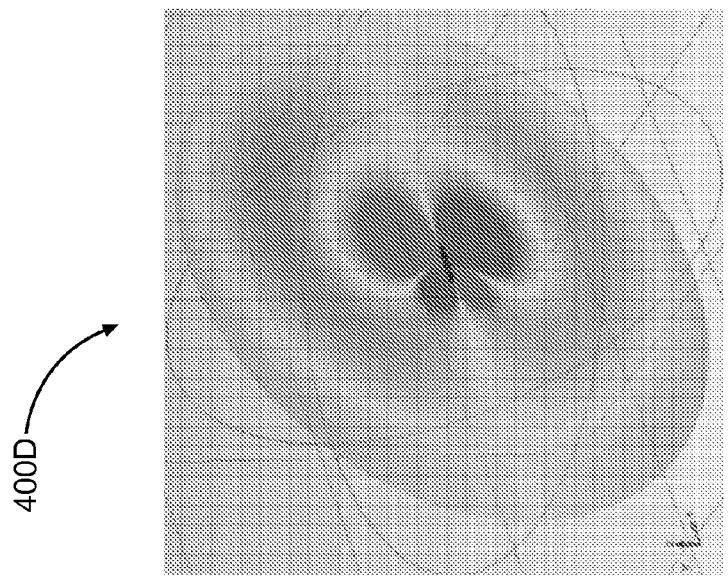
FIGS. 4C and 4D illustrate generally a simulation of an example of an asymmetric acoustic bender bar transducer deformed in a second order acoustic vibration mode.
Figure 4C:
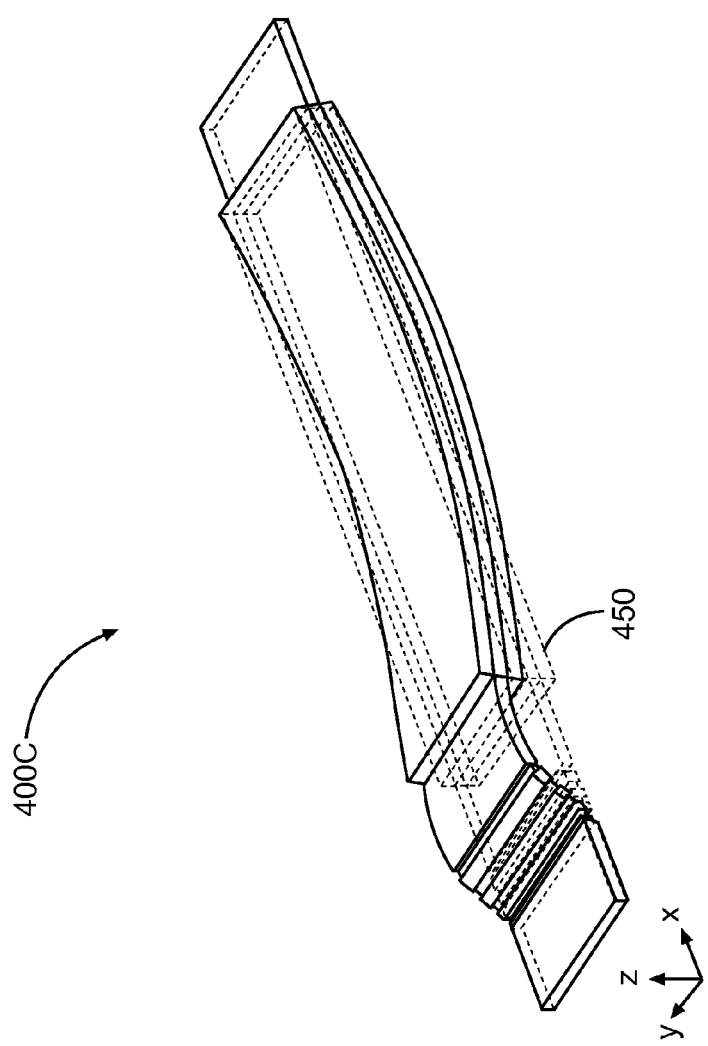
Figure 4F:
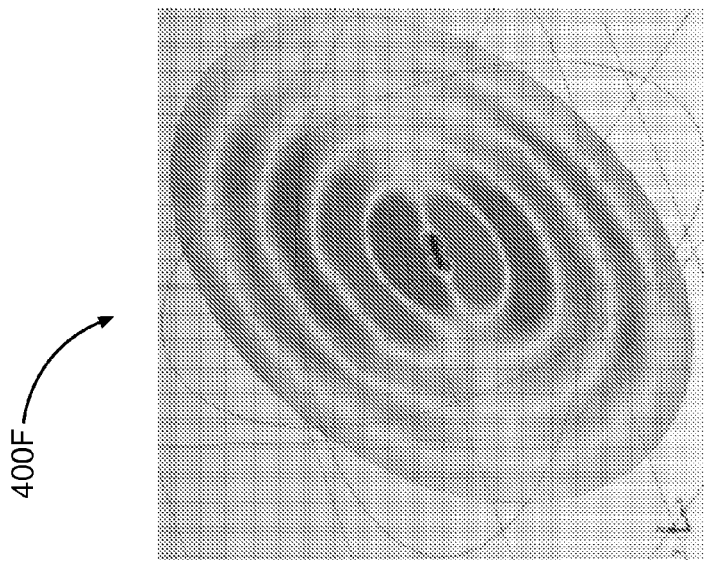
FIGS. 4E and 4F illustrate generally a simulation of an example of an asymmetric acoustic bender bar transducer deformed in a third order acoustic vibration mode.
Figure 4E:
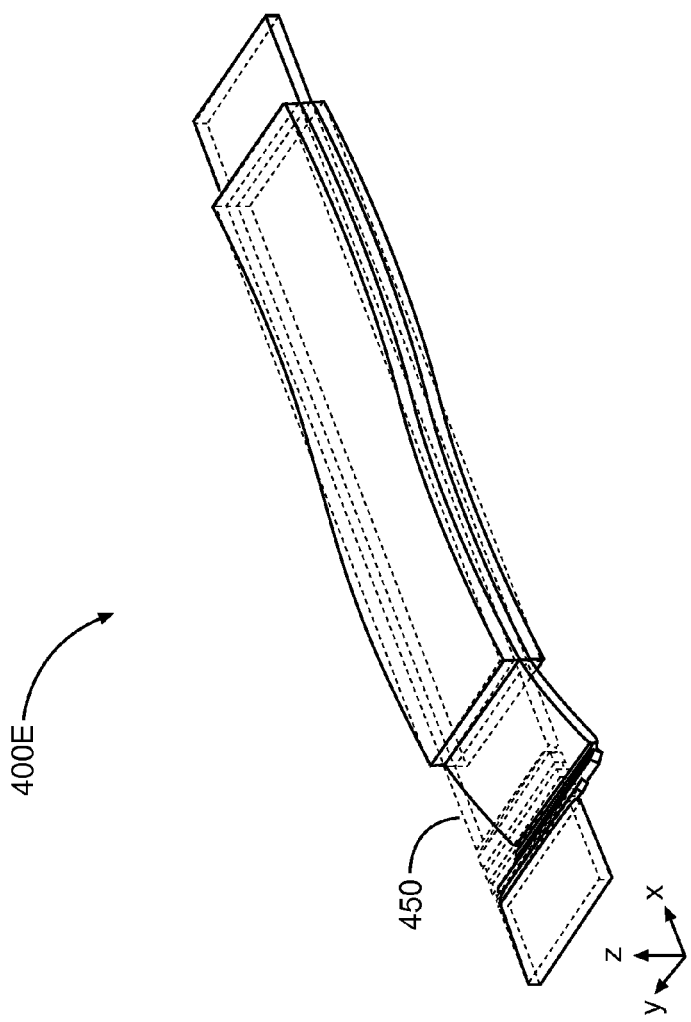
Figure 5:
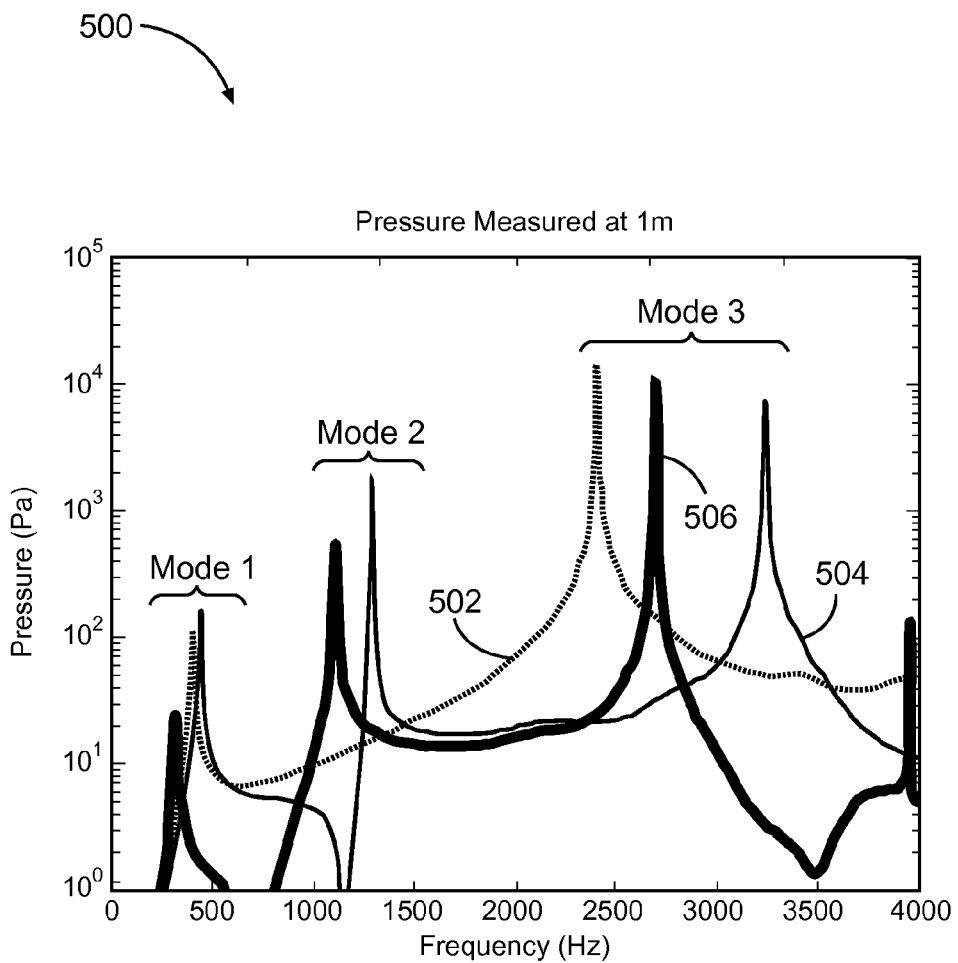
FIG. 5 illustrates generally a comparison between pressures simulated at a measurement location centrally-located one meter away from various examples of acoustic transducers, including a symmetric bender bar configuration, and two asymmetric bender bar configurations.

FIGS. 4A and 4B illustrate generally a simulation of an example of an asymmetric acoustic bender bar transducer 450 deformed in a first order acoustic vibration mode 400A, and a corresponding pressure field 400B, similar to the example of FIGS. 1A and 1B, respectively, but instead including an asymmetric transducer 450 configuration and stiffness adjusting features, as shown in the example of FIG. 3B. FIGS. 4C and 4D illustrate generally a simulation of an example of an asymmetric acoustic bender bar transducer 450 deformed in a second order acoustic vibration mode 400C, and a corresponding pressure field 400D. Unlike the symmetric transducer 150 configuration shown in FIGS. 2B and 2C, the asymmetric transducer 150 produces significant acoustic output when driven at or near a second order acoustic vibration mode resonance, as shown in FIG. 5. FIGS. 4E and 4F illustrate generally a simulation of an example of an asymmetric acoustic bender bar transducer 450 deformed in a third order acoustic vibration mode 400E, and a corresponding pressure field 400F.

FIG. 5 illustrates generally a comparison between absolute pressures in Pascals (Pa) shown with respect to acoustic oscillation frequency, simulated at a measurement location centrally-located one meter away from various examples of acoustic transducers, including a symmetric bender bar configuration, and two asymmetric bender bar configurations. A first plot 502 shows a simulated pressure versus frequency for the symmetric transducer 150 configuration shown in FIG. 1A, for example. No pressure output peak is visible corresponding to a second order acoustic vibration mode (Mode 2) for the first plot 502. A second plot 504 shows a simulated pressure versus frequency for the asymmetric transducer 350A shown in FIG. 3A, but without the stiffness adjusting features.

A third plot 506 shows a simulated pressure versus frequency for asymmetric transducer 350B shown in FIG. 3B, including the stiffness adjusting feature. In particular, the stiffness adjusting feature generally reduces a stiffness of the flange portion of the base plate 302 in the second region 306B. Such an adjustment shifts the third order mode (Mode 3) resonance peak downward in frequency in the third plot 506 as compared to the second plot 504. Similarly, the second order mode (Mode 2) resonance peak is also shifted downward in frequency in the third plot 506 as compared to plot 504. The first order mode (Mode 1) resonance peaks remain largely unchanged in all three plots 502, 504, and 506. In this manner, the second order mode (Mode 2) and third order mode (Mode 3) may be located in a desired range of frequencies for particular logging applications, without significantly altering the location of the first order mode (Mode 1).

FIG. 6 illustrates generally yet another example of an asymmetric acoustic bender bar transducer 600 including an anchoring element. The asymmetric acoustic bender bar transducer 600 shown in FIG. 6 includes a base plate 602 having a first region 606A extending in a first direction, and a second region 606B extending in a second direction opposite the first direction. First and second piezoelectric slabs 604A and 604B are coupled to the base plate, as in many other examples.

In an illustration, such as corresponding to some of the examples discussed above in relation to FIGS. 1A through 1F, 2 through 3, 4A through 4F, and 5, a total acoustic transducer length (e.g., a base plate length) is about 6.3" long, along a longitudinal axis, X. Such a configuration generally provides resonant modes in the range of about 300 Hz to 550 Hz (Mode 1), about 1000 Hz to 1600 Hz (Mode 2), and about 2400 Hz to 4000 Hz (Mode 3), as shown illustratively in FIG. 5. Roughly, this corresponds to a ratio of 2.5 to 3 between adjacent modes (e.g., Mode 2 is about 2.5 to 3 times as high in frequency as Mode 1, and Mode 3 is about 2.5 to 3 times as high in frequency as Mode 2).

The present inventors have also recognized, among other things, that a broader range of useful frequencies is provided by locating two modes more nearby each other than the ratio of 2.5 to 3 discussed above, to provide a bandwidth in a particular frequency range that is wider than the narrow bands provided by each mode individually. Such a mode configuration is referred to as a "wideband" configuration. For example, as shown in FIG. 6, an anchoring element is included, such as a first anchoring element 610A and a second anchoring element 610B, to provide a "wideband" configuration. The anchoring elements are clamped or otherwise mechanically fixed to the base plate at one end, and to a fixed mount at the opposite end. An asymmetric example is shown in FIG. 6; however the anchoring techniques discussed herein are also applicable to acoustic transducers having a symmetrical configuration.

Such anchoring elements are located at a position, N, along the base plate 602, where a "nodal line" is established. A nodal line is a position along the transducer 600 where the displacement during oscillation is zero or about zero for a particular mode. For example, the first order mode has no nodal lines in the central region of the transducer 600. The second order mode has one nodal line, which is either centered along the longitudinal axis, X (in the case of a symmetric transducer configuration), or slightly shifted towards the "weaker" (e.g., more flexible) side along the longitudinal axis away from the center. The addition of the anchoring elements 610A and 610B coupling the base plate 602 mechanically to the fixed location such as fixed mounts at the nodal line does not affect the resonant frequency and mode shape of the corresponding mode establishing the nodal line.

Such anchoring elements 610A and 610B do affect other modes whose nodal lines do not coincide with the location of the anchoring elements 610A and 610B. As an illustration, if anchoring elements 610A or 610B are located at a nodal line of the second order mode (Mode 2), then a resonant frequency peak (e.g., a pressure peak versus frequency) of Mode 2 does not shift appreciably. However, due to the anchoring and stiffness provided by anchoring elements 610A and 610B, and the new boundary conditions established by such anchoring elements 610A and 610B, a resonant frequency of the first order mode (Mode 1) is increased. In this manner, Mode 1 may be shifted to a desired resonant frequency nearby or almost overlapping with Mode 2. A strip or square-profiled bar is shown as anchoring element in the examples of FIGS. 6, 7A through 7D, 8A through 8B, and 9. However, other mechanical anchors may be used, such as including clamps, flanges, bolts, bars having other cross sectional shapes, or including other structures, to provide a mechanical constraint (e.g., a stiffening element) at a desired nodal line.

Figure 7B:
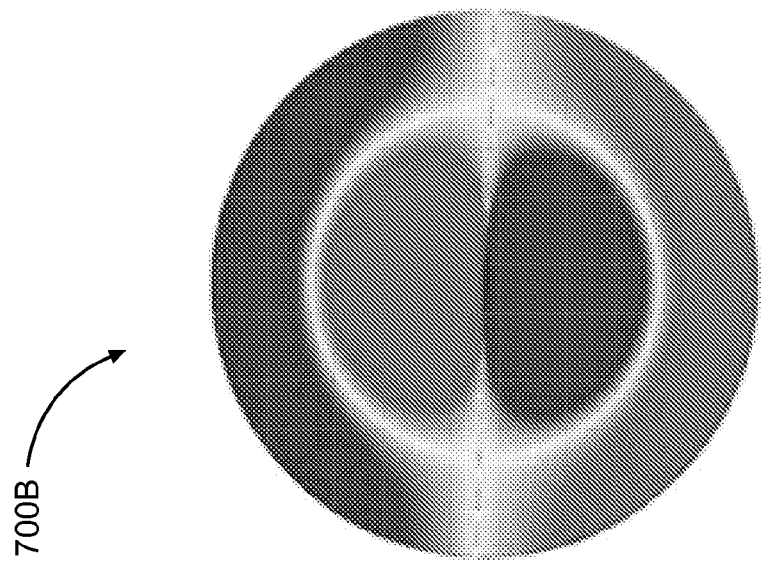
FIGS. 7A and 7B illustrate generally a simulation of an example of a portion of an acoustic bender bar transducer deforming in a first order acoustic vibration mode, the portion of the transducer including an anchoring element.
Figure 7A:
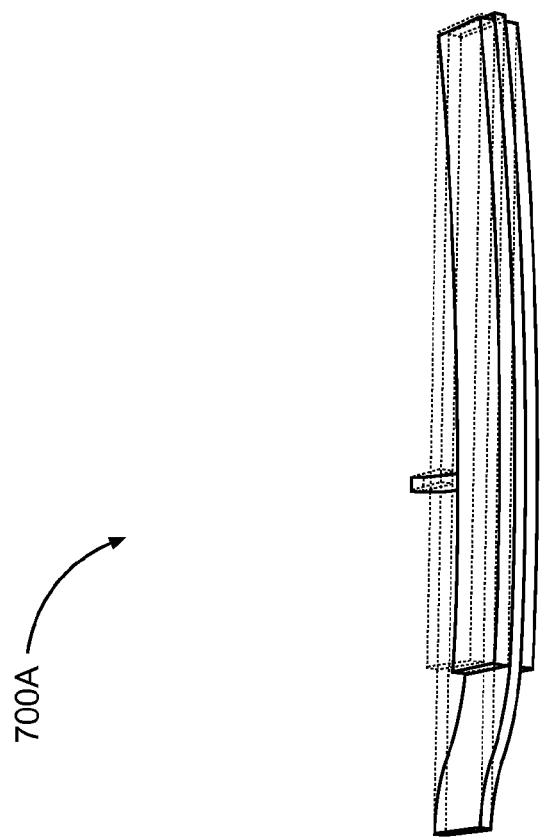
Figure 7D:
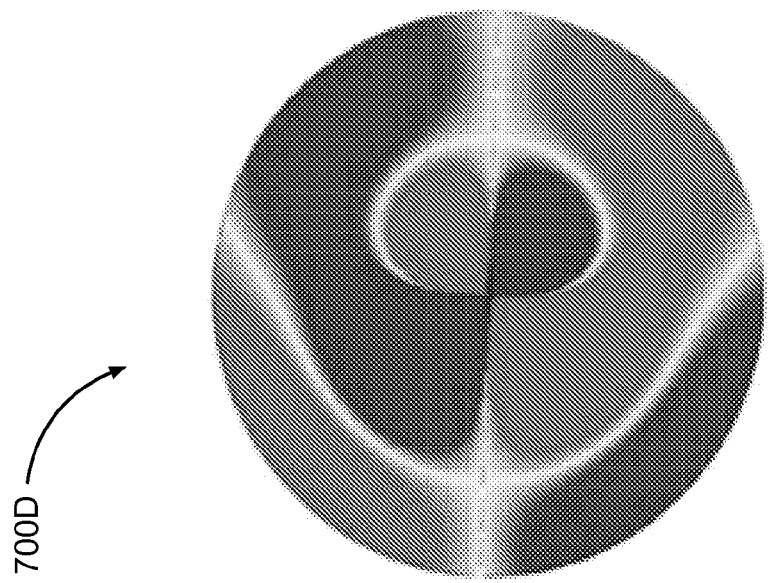
FIGS. 7C and 7D illustrate generally a simulation of an example of a portion of an acoustic bender bar transducer deforming in a second order acoustic vibration mode, the portion of the transducer including an anchoring element.
Figure 7C:
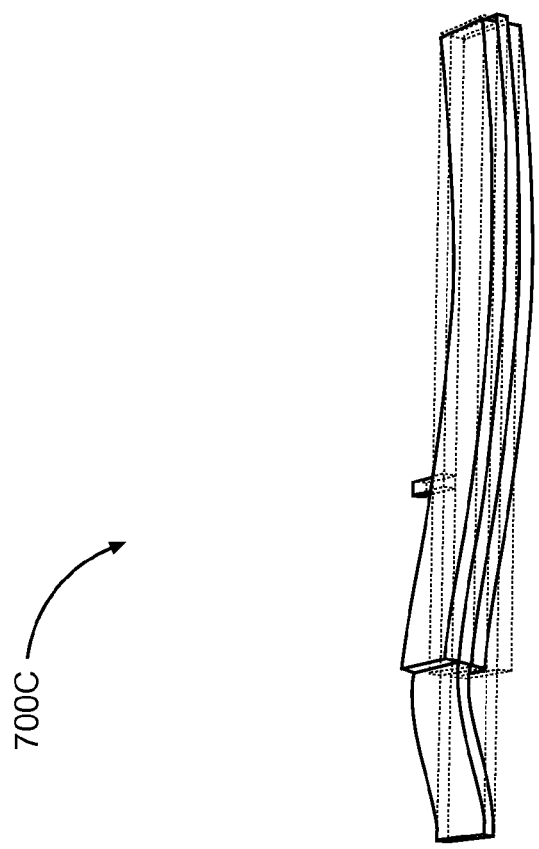

FIGS. 7A and 7B illustrate generally a simulation of an example of a portion of an acoustic bender bar transducer deforming in a first order acoustic vibration mode 700A, the portion of the transducer including an anchoring element. In FIG. 7B, a corresponding pressure field 700B is shown. FIGS. 7C and 7D illustrate generally a simulation of an example of a portion of an acoustic bender bar transducer deforming in a second order acoustic vibration mode 700C, the portion of the transducer including an anchoring element. In FIG. 7D, a corresponding pressure field 700D is shown.

Figure 8A:
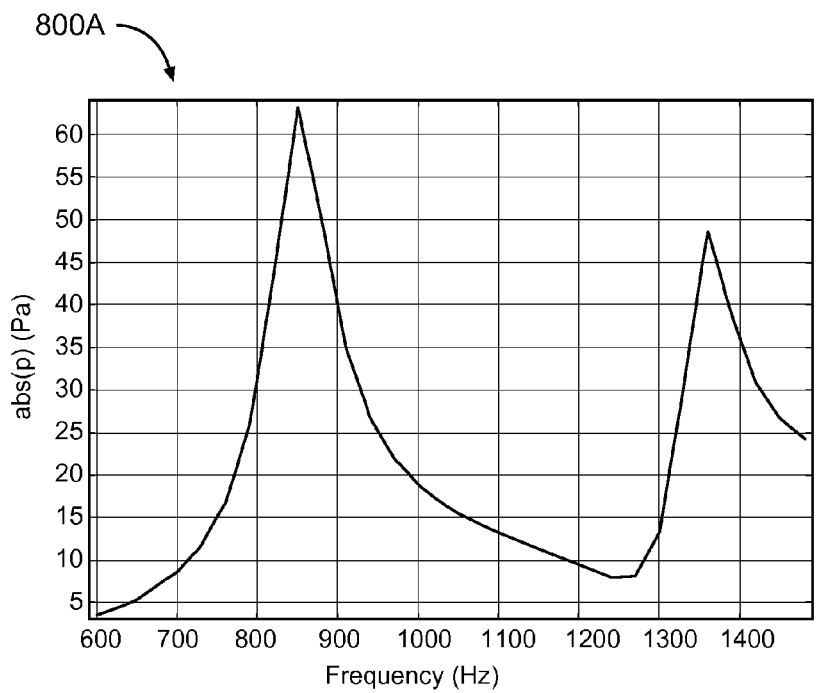
FIGS. 8A and 8B illustrate generally simulations of an absolute pressure at a central location one meter away from an example of an asymmetric acoustic bender bar transducer in water, shown with respect to electrical drive frequency, including using an anchoring element having a width of 0.4 inches in FIG. 8A, and an anchoring element having a width of 0.6 inches in FIG. 8B.
Figure 8B:
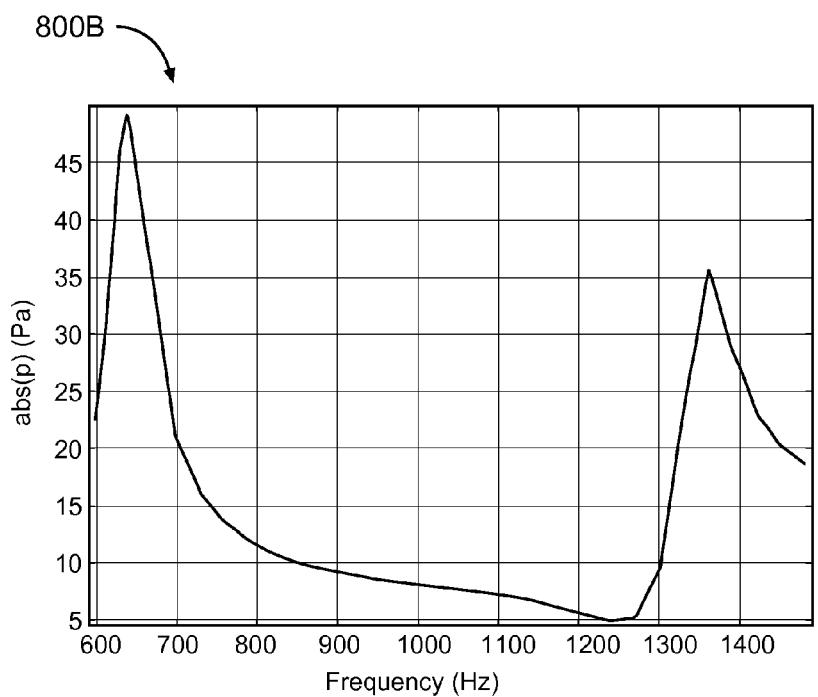

FIGS. 8A and 8B illustrate generally simulations 800A and 800B of an absolute pressure at a central location one meter away from an example of a portion of an asymmetric acoustic bender bar transducer in water, shown with respect to electrical drive frequency, including using an anchoring element having a width of 0.4 inches in FIG. 8A, and an anchoring element having a width of 0.6 inches in FIG. 8B (width specified along the axis, N, and length specified along the axis, X, shown in FIG. 6). The height and length of the anchoring element are 0.1 inches in both cases, in this illustration.

The simulation 800A of FIG. 8A shows a first order resonant peak of about 850 Hz, which is within a range of frequencies useful for exciting flexural waves for shear slowness or other shear-wave-related formation measurements. In FIG. 8B, the first order resonant peak is located at around 640 Hz, showing generally that a width of the anchoring element is one parameter useful for adjusting the first order resonant peak without appreciably altering the second order peak location. While the absolute pressures in the illustrations of FIGS. 8A and 8B are relatively small (less than about 50 Pa), this is attributable to a damping factor added to the simulation model, and the illustrations are presented primarily for illustration of resonant peak locations.

Figure 9:
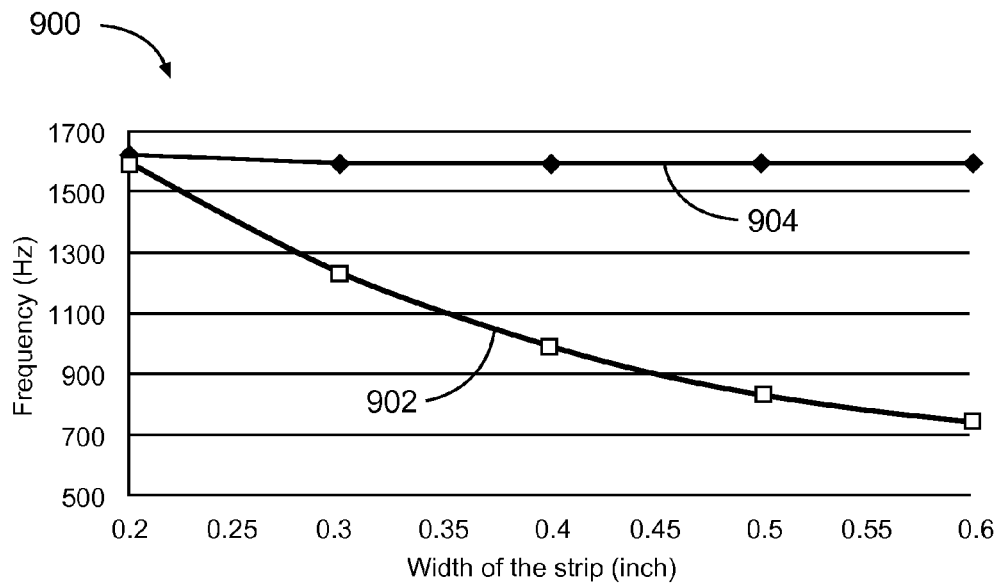
FIG. 9 illustrates generally resonant frequencies of first and second modes of an example of an asymmetric acoustic bender bar transducer as a function of a width of an anchoring element located at a node location.

FIG. 9 illustrates generally resonant frequencies of first and second modes of an example of an asymmetric acoustic bender bar transducer simulated as a function of a width of an anchoring element located at a node location. In FIG. 9, anchoring elements of about 0.1 inches in height and length are swept from about 0.2 inches to about 0.6 inches in width (width specified along the axis, N, and length specified along the axis, X, shown in FIG. 6). Generally, as the width of the anchoring element increases (e.g., as a separation between the base plate and the fixed mount increases), the stiffening effect is lessened and a resonance frequency 902 of the first order mode (Mode 1) decreases while a resonance frequency 904 of the second order mode (Mode 2) remains roughly constant.

Figure 10:
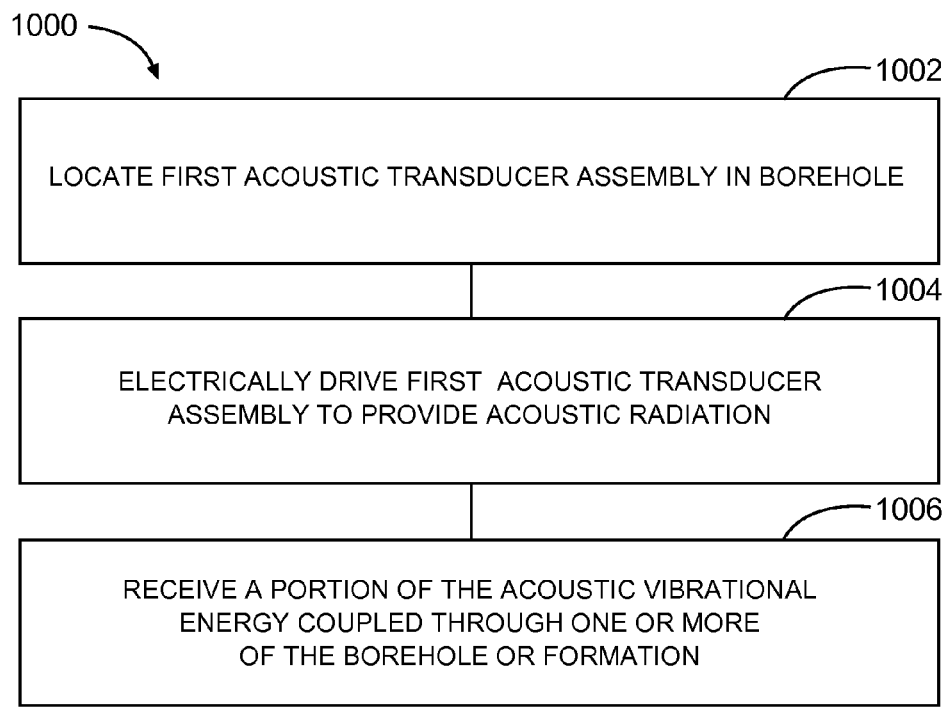
FIG. 10 illustrates generally an example of a technique, such as a method, for exciting a geologic formation using acoustic vibrational energy radiated by an acoustic transducer assembly.

FIG. 10 illustrates generally an example of a technique 1000, such as a method, for exciting a geologic formation using acoustic vibrational energy radiated by an acoustic transducer assembly. At 1002, a first acoustic transducer assembly is located in a borehole. Such an acoustic transducer assembly may include a symmetric configuration or asymmetric configuration, or the transducer assembly may include multiple transducers having one or more of the asymmetric or symmetric configurations discussed in other examples. According to various examples, the first acoustic transducer assembly is generally included as a portion of a drilling apparatus shown in FIG. 11 or a logging apparatus as shown in FIG. 12.

At 1004, the first acoustic transducer assembly is electrically driven to provide acoustic radiation. The electrical drive signal may be on the order of a kilovolt or more applied across a piezoelectric element included as a portion of the acoustic transducer assembly to transmit (e.g. couple) acoustic energy into a geologic formation from the borehole. In this manner, the geologic formation is excited by acoustic vibrational energy radiated by the acoustic transducer assembly.

At 1006, a second acoustic transducer assembly receives a portion of the acoustic vibrational energy coupled through one or more of the borehole or the formation. Formation parameters such as a slowness parameter, an anisotropy parameter, or a dispersion parameter may then be determined using information about the received portion of the acoustic vibrational energy.

FIG. 11 illustrates generally an example of a drilling apparatus, such as including a measure-while-drilling (MWD) or log-while-drilling (LWD) capability. The illustrative example of FIG. 11 may include apparatus such as shown and discussed elsewhere herein, or techniques shown and discussed elsewhere herein, and generally includes using one or more symmetric or asymmetric dipole acoustic transducers. In the example of FIG. 11, a drilling rig or platform 1102 generally includes a derrick 1104 or other supporting structure, such as including or coupled to a hoist 1106. The hoist 1106 may be used for raising or lowering equipment or other apparatus such as drill string 1108. The drill string 1108 may access a borehole 1116, such as through a well head 1112. The lower end of the drill string 1108 may include various apparatus, such as a drill head 1114, to create the borehole 1116. A drilling fluid or "mud" may be circulated in the annular region around the drill head 1114 or elsewhere, such as provided to the borehole 1116 through a supply pipe 1122, circulated by a pump 1120, and returning to the surface to be captured in a retention pit 1124 or sump. Various subs or tool assemblies may be located along the drill string 1108, such as include a bottom hole assembly (BHA) 1126 or a second sub 1128.

As the BHA 1126 or second sub 1128 pass through various regions of a formation 1118, information may be obtained. For example, the BHA 1126, or the second sub 1128, may include apparatus such as shown in the examples of FIG. 1A, 1C, 1D, 3A, 3B, or 6, such as to perform acoustic (i.e., "sonic") logging The second sub 1128 may include wireless telemetry or logging capabilities, or both, such as to transmit or later provide information indicative of acoustic energy received by a transducer to operators on the surface or for later access in evaluation of formation 1118 properties. For example, portions 1130 of the apparatus 1100 at the surface may include one or more of wireless telemetry, processor circuitry, or memory facilities, such as to support log-while-drilling (LWD) or measurement-while-drilling (MWD) operations.

FIG. 12 illustrates generally an example of a wireline logging apparatus. The illustrative example of FIG. 12 may include apparatus such as shown and discussed elsewhere herein, or techniques shown and discussed elsewhere herein, and generally includes using one or more symmetric or asymmetric dipole acoustic transducers. Similar to the example of FIG. 11, a hoist 1206 may be included as a portion of a platform 1202, such as coupled to a derrick 1204, and used to raise or lower equipment such as a wireline sonde 1210 into or out of a borehole. In this wireline example, a cable 1242 may provide a communicative coupling between a logging facility 1244 (e.g., including a processor circuit 1245 or other storage or control circuitry) and the sonde 1210. In this manner, information about the formation 1218 may be obtained, such as using a dipole acoustic transducer configuration for sonic logging using the sonde 1210, as discussed in other examples herein.

FIG. 13 illustrates generally an example of a system 1300, including a well tool 1320 within a borehole communicatively coupled to apparatus on or above the surface 1316. In the illustration of FIG. 13, the well tool 1320 includes a controller circuit 1306. The controller circuit 1306 is configured to electrically drive one or more acoustic transducers, such as a first acoustic transducer 1302A, and a second acoustic transducer 1302B, to acoustically excite a formation surrounding the borehole. According to many examples, the first and second transducers 1302A and 1302B are located within a housing of the well tool 1320, and are acoustically coupled to the formation through the fluid medium surrounding the well tool 1320 using one or more apertures located in the housing of the well tool 1320.

For example, the first and second acoustic transducers 1302A and 1302B include dipole acoustic transducers, such as oriented orthogonally to each other so that an axis of radiation 1312 for the second acoustic transducer 1302B (normal to the plane of the second acoustic transducer 1302B) is rotated 90 degrees with respect to the radiation axis of the first acoustic transducer 1302A. One or more receiving transducers, such as a third acoustic transducer 1310 (e.g., a ring, monopole, or dipole transducer), is located several meters or tens of meters away from the first and second transducers 1302A and 1302B, to receive a portion of the acoustic vibrational energy reflected or refracted back toward the well tool 1320.

In an illustrative example of a wireline or tubing-conveyed sonde, the well tool 1320 is communicatively and mechanically coupled to the surface via a cable 1314 or tube. A processor circuit 1308 is located on or above the surface 1316, coupled to a processor-readable medium 1304. The processor circuit is programmed to receive information indicative of the received acoustic vibrational energy, and may one or more of store such information or process such information to determine one or more formation parameters, such as a slowness parameter, an anisotropy parameter, or a dispersion characteristic, for example. Such parameters may be further processed to provide information indicative of a formation composition or porosity, with respect to one or more of depth or azimuth around the circumference of the tool.

While the example of FIG. 13 shows the processor circuit 1308 on or above the surface 1316, the processor circuit 1308 and processor-readable medium 1304 may also or may instead be located within a tool body or sonde downhole, or as a portion of a surface processing system. For example, the controller circuit 1306 generally includes a processor circuit or processor-readable medium. The processor circuit 1308 may be coupled to a communication circuit, such as to provide a communicative coupling between the processor circuit 1308 and the controller circuit 1306. For example, the communication circuit may include one or more of a wireless transmitter, receiver or transceiver, such as using an inductive, radiative (e.g., electromagnetic), or acoustic (e.g., mud pulsing) communication scheme. The communication circuit may use other techniques to transmit or receive information, such as a fiber-optic or other optical communication scheme.

The processor circuit 1308 in FIG. 13 is coupled to a display 1318, to present information indicative of acoustic or formation parameters to a user, or to provide other information regarding status or control of various portions of the system 1300. Generally, the phrase "processor-readable medium" shall be taken to include any tangible non-transitory device which is capable of storing or encoding a sequence of instructions for execution by the machine and that causes the machine to perform any one of the described and/or claimed methodologies. Such a processor-readable medium 1304 includes a machine-readable medium or a computer-readable medium. The term "non-transitory medium" expressly includes all forms of storage devices, including drives (optical, magnetic, etc.) and all forms of memory devices (e.g., Dynamic Random Access Memory (DRAM), Flash (of all storage designs, including NAND or NOR topologies), Static Random Access Memory (SRAM), Magnetic Random Access Memory (MRAM), phase change memory, etc., as well as all other structures designed to store information of any type for later retrieval. In an example, one or more of the techniques described herein, is implemented at least in part as instructions stored on the processor-readable medium 1304. Such instructions cause the processor circuit 1308 or other portions of the apparatus 1300 to perform various operations, such as including portions or entireties of one or more techniques described herein.

The transducer examples discussed in this application may be used in a receiving configuration, as well as a transmitting configuration, and the discussion of transmission (e.g., electrical-to-acoustic transduction) behavior is generally reciprocally applicable to receiving (e.g., acoustic-to-electrical transduction) behavior of such transducers. Also, a well tool need not use a single type of transducer. For example, a combination of one or more monopole (e.g., ring), dipole, multi-pole, asymmetric, or symmetric transducer configurations may be used to provide a broad range of sonic logging capabilities within a single tool or system.

Also, for purposes of illustration, the examples of FIGS. 11 through 13 show a vertically-oriented borehole or tool configuration. However, the apparatus and techniques described herein may also be used in other borehole configurations, such as a borehole including a horizontal penetration direction, or an oblique borehole configuration, for example. The examples of FIGS. 11 through 13 also generally illustrate land-based examples. But, apparatus and techniques described herein may be used in offshore environments as well, such as for subsea operations. In particular, offshore or subsea operations may include use of wireline or LWD/MWD apparatus and techniques including aspects of the examples herein.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. In this description, references to "one embodiment" or "an embodiment," or to "one example" or "an example" mean that the feature being referred to is, or may be, included in at least one embodiment or example of the invention. Separate references to "an embodiment" or "one embodiment" or to "one example" or "an example" in this description are not intended to necessarily refer to the same embodiment or example; however, neither are such embodiments mutually exclusive, unless so stated or as will be readily apparent to those of ordinary skill in the art having the benefit of this disclosure.

Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The claimed invention is:

1. An acoustic transducer assembly, comprising:
a base plate;
a first piezoelectric slab located on a first surface of the base plate; and
a second piezoelectric slab located on a second surface of the base plate opposite the first surface;
wherein the base plate includes:
a first region extending axially in a first direction beyond the first and second piezoelectric slabs along a specified axis of the base plate; and
a second region extending axially in a second direction, opposite the first direction, beyond the first and second piezoelectric slabs along the specified axis of the acoustic transducer assembly; and
wherein a length of the first region along the specified axis is different than a length of the second region along the specified axis to provide an asymmetric configuration.

2. The acoustic transducer assembly of claim 1, wherein the difference in lengths of the first and second regions of the base plate is configured to establish acoustic radiation at a frequency corresponding to a second order acoustic vibration mode of the acoustic transducer assembly.

3. The acoustic transducer assembly of claim 1, wherein the specified axis comprises a longitudinal axis of the acoustic transducer assembly.

4. The acoustic transducer assembly of claim 1, wherein the second region includes one or more features to reduce a stiffness of the base plate in the second region.

5. The acoustic transducer assembly of claim 4, wherein the one or more features include one or more slots in the base plate in the second region.

6. The acoustic transducer assembly of claim 4, wherein the one or more features are configured to decrease a frequency corresponding to a second order acoustic vibration mode, and to decrease a frequency corresponding to a third order acoustic vibration mode, as compared to an acoustic transducer assembly lacking the one or more features.

7. The acoustic transducer assembly of claim 1, comprising a first anchoring element mechanically coupled to the base plate at a location corresponding to a node location of a specified acoustic vibration mode.

8. The acoustic transducer assembly of claim 7, wherein the specified acoustic vibration mode comprises a second order acoustic vibration mode.

9. The acoustic transducer assembly of claim 7, wherein one or more of the location of the first anchoring element or a dimension of the first anchoring element is configured to shift a radiation frequency of a first order acoustic vibration mode without substantially shifting a radiation frequency of second order acoustic vibration mode, as compared to an acoustic transducer assembly lacking the first anchoring element at the node location of the specified acoustic vibration mode.

10. The acoustic transducer assembly of claim 9, wherein the dimension of first anchoring element is configured to shift the radiation frequency of the first order acoustic vibration mode includes one or more of a length, a width, or a thickness of the first anchoring element.

11. The acoustic transducer assembly of claim 9, wherein the location of the first anchoring element is configured to increase the radiation frequency of the first order acoustic vibration mode as compared to an acoustic transducer assembly lacking the first anchoring element at the node location of the specified acoustic vibration mode.

12. The acoustic transducer of claim 1, wherein the base plate includes steel; and wherein the piezoelectric material includes lead zirconate titanate (PZT).

13. A system, comprising:
a first acoustic transducer assembly, comprising:
a base plate;
a first piezoelectric slab located on a first surface of the base plate; and
a second piezoelectric slab located on a second surface of the base plate opposite the first surface;
wherein the base plate includes:
a first region extending axially in a first direction beyond the first and second piezoelectric slabs along a specified axis of the base plate; and
a second region extending axially in a second direction, opposite the first direction, beyond the first and second piezoelectric slabs along the specified axis of the acoustic transducer assembly;
wherein a length of the first region along the specified axis is different than a length of the second region along the specified axis to provide an asymmetric configuration;
wherein a difference in lengths of the first and second regions of the base plate is configured to establish radiation at a frequency corresponding to a second order acoustic vibration mode of the acoustic transducer assembly; and
wherein the first and second piezoelectric slabs are coupleable to a drive circuit;
a controller circuit coupled to the acoustic transducer assembly and configured to electrically drive the acoustic transducer assembly to provide acoustic radiation including specified ranges of frequencies to excite a geologic formation from a borehole extending through the geologic formation using the acoustic radiation.

14. The system of claim 13, comprising a well tool housing the acoustic transducer assembly and the controller circuit.

15. The system of claim 14, wherein the well tool houses the controller circuit.

16. The system of claim 13, comprising a first anchoring element mechanically coupled to the base plate at a location corresponding to a node location of a specified acoustic vibration mode.

17. The system of claim 13,
wherein the first acoustic transducer assembly provides dipole acoustic radiation along a first radiation axis; and
wherein the system comprises a second acoustic transducer assembly arranged to provide dipole acoustic radiation along a second radiation axis orthogonal to the first radiation axis.

18. A method for exciting a geologic formation using acoustic vibrational energy, comprising:

locating a first acoustic transducer assembly in a borehole extending through the geologic formation, the first acoustic transducer assembly comprising:

a base plate having first and second regions extending in opposite directions beyond a piezoelectric portion;

wherein a length of the first region is different than a length of the second region to provide an asymmetric configuration; and wherein a difference in lengths of the first and second regions of the base plate is configured to establish a radiating frequency corresponding to a second order acoustic vibration mode of the first acoustic transducer assembly;

electrically driving the first acoustic transducer assembly to provide acoustic radiation including specified ranges of frequencies to excite the geologic formation using acoustic vibrational energy radiated by the acoustic transducer assembly located in the borehole; and receiving a portion of the acoustic vibrational energy coupled through one or more of the borehole or the formation using a second acoustic transducer assembly.

19. The method of claim 18, wherein the second region of the acoustic transducer assembly includes one or more features to reduce a stiffness of the base plate in the second region; and wherein the acoustic vibrational energy radiated by the acoustic transducer assembly includes a radiation frequency corresponding to an acoustic vibration mode established at least in part using the one or more features.

20. The method of claim 18, wherein the acoustic transducer assembly includes a first anchoring element mechanically coupled to the base plate at a location along the longitudinal axis of the base plate corresponding to a node location of a specified acoustic vibration mode; and wherein the acoustic vibrational energy radiated by the acoustic transducer assembly includes a radiation frequency corresponding to an acoustic vibration mode established at least in part using the first anchoring element.

21. The method of claim 18, wherein the first and second acoustic transducer assemblies are housed in a well tool; and wherein the first acoustic transducer assembly is located in a first position along the well tool and the second acoustic transducer assembly is located in a different second position along the well tool.

22. The method of claim 21, wherein the second acoustic transducer assembly is included as a portion of an array of receive transducers located along the well tool.

* * * * *